3,223,651
CO-CRYSTALLIZED VANADIUM-TITANIUM-
ALUMINUM HALIDE CATALYST SYSTEM
Erik G. M. Tornqvist, Roselle, N.J., and Perry A. Argabright, Englewood, Colo., assignors to Esso Research and Engineering Company, a corporation of Delaware
No Drawing. Original application July 17, 1959, Ser. No. 827,710, now Patent No. 3,139,419, dated June 30, 1964. Divided and this application Feb. 20, 1963, Ser. No. 260,081
5 Claims. (Cl. 252—429)

This application is a divisional application of Serial No. 827,710, filed July 17, 1959, now Patent 3,139,419.

This invention relates to an improved catalyst system utilizing improved catalyst components for the low pressure polymerization of alpha olefins. More particularly it relates to these components containing co-crystallized reduced titanium and vanadium halides with co-crystallized aluminum trihalides, their preferred method of preparation and their use in obtaining polymer products of reduced Bell brittleness temperature.

The low pressure polymerization of alpha olefins with catalyst systems made up of a partially reduced, heavy, transition metal compound and a reducing metal-containing compound to high density, often isotatic, high molecular weight, solid, relatively linear products has been assuming ever increasing importance and is now well known.

For the purpose of convenience details of the low pressure catalytic process and the products obtained thereby are presented below, although it should be realized that these by themselves constitute no part of this invention.

The alpha olefinic feeds utilized in polymerization and copolymerization include $C_2$–$C_6$ olefins, e.g. ethylene, propylene, butene-1, hexene 1, etc., with ethylene and propylene preferred. The process is described in this literature, e.g. see U.K. Patent 810,023 and "Scientific American," September 1957, pages 98 et seq.

In the process the polymers are prepared by polymerizing the monomer with the aid of certain polymerization catalysts. The catalysts are solid, insoluble, reaction products obtained by partially reducing a heavy metal compound of a Group IV–B, V–B, and VI–B metal of the Periodic System, such as vanadium tetrachloride, or a titanium halide, e.g. $TiCl_4$, $TiBr_4$, etc., preferably with metallic aluminum. The preferred catalyst of this type is usually prepared by reducing 1 mole of titanium tetrahalide, usually tetrachloredi, with about-one third mole of aluminum to give a material corresponding to

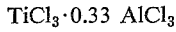
$TiCl_3 \cdot 0.33\ AlCl_3$ thus containing co-crystallized $AlCl_3$. (For further details see copending U.S. Application S.N. 578,198, now Patent No. 3,128,252, filed April 6, 1956 and S.N. 766,376, now Patent No. 3,032,513, filed October 19, 1958.) The product is then activated with an aluminum alkyl compound corresponding to the formula RR'AlX'. In this formula R, R' and X' preferably are alkyl groups of 2 to 8 carbon atoms, although X' may alternatively be hydrogen or a halogen, notably chlorine. Typical examples of the aluminum alkyl compounds are aluminum triethyl, diethyl aluminum chloride, aluminum triisobulty, etc.

The monomer is then contacted with the resulting catalyst in the presence of a hydrocarbon solvent such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15 percent based on total contents so as to allow easy handling of the polymerized mixture. The proper polymer concentration can be obtained by having enough of the inert diluent present, or by stopping the polymerization before the full polymerization capacity of the catalyst has been utilized, or before 100 percent conversion of the monomer has been realized.

When the desired degree of polymerization has been reached, a $C_1$ to $C_2$ alkanol such as methanol or isopropyl alcohol desirably in combination with a chelating agent such as acetylacetone is normally added to the reaction mixture for the purpose of dissolving and deactivating the catalyst, removing some catalyst residues from the polymer and for precipitating the crystalline polymer product from solution.

The polymers produced have number average molecular weights in the range of about 100,000 to 300,000 or even as high as 3,000,000 as determined by the intrinsic viscosity method using the I. Harris correlation (J. Polymer Science, 8, 361 (1952)). The polymers can have a high degree of crystallinity and a low solubility in n-heptane.

It is to be understood that the term "low pressure" polymer as used herein connotes material prepared in the indicated manner and includes homo- and copolymers.

One of the problems encountered in the process is excessive low temperature polymer brittleness, particularly in the case of polypropylene, which limits the utility of the product as a packaging material for frozen foods, wire and cable insulation, plastic pipes, etc. Low temperature brittleness is commonly measured by the Bell Brittleness Temperature Test (ASTM Test D-746).

It has now been found that utilizing as the heavy transition metal halide components a co-crystallized titanium vanadium and aluminum component corresponding substantially to the formula

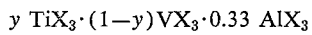
$y\ TiX_3 \cdot (1-y)VX_3 \cdot 0.33\ AlX_3$ wherein X is halogen and y is .50 to .97, in the catalyst system, gives extremely active catalysts and polymer products of reduced Bell brittleness temperature.

It is especially surprising that the catalyst components of this invention are as effective as stated in that components containing the 3 metals which are not co-crystallized are substantially less effective in catalysis. Furthermore, the results obtained with the use of the catalysts of this invention are superior to those obtained with separate amounts of titanium and vanadium halides. Thus, a synergistic effect is produced by the co-crystallized compounds.

In the formula of the improved components of this invention shown above, X is a halogen, preferably chlorine or bromine, and y is .50 to .97, preferably .67 to .90. Data have demonstrated that figures outside this range are not as efficacious.

The catalyst components are activated as previously stated in the same manner as utilized in art. Molecular ratio of the aluminum alkyl compound to co-crystallized component is in the range of 0.5 to 10.

Since it is necessary that a co-crystallized system be utilized herein, the method of preparation is important. These components can thus be prepared generally by the slurry or bomb technique.

In the slurry technique, in order to prepare the materials of this invention the titanium and vanadium components, e.g. titanium tetrachloride and vanadium tetrachloride, are added as such or in an aromatic diluent to aluminum powder in an aromatic diluent. The amounts of the components are indicated from the formula and the resultant slurry maintained at a minimum temperature of about 80° C. The reaction is carried out for a time sufficient to produce substantially complete reaction of the aluminum with the titanium tetrachloride and vanadium tetrachloride so as to obtain the desired product co-crystallized with aluminum chloride. The reaction time is not critical but will generally be in the range of 0.5 to 20 hours, preferably 1 to 5 hours.

The powdered aluminum metal used in the process is finely divided ball-milled or atomized aluminum powder such as Alcoa grade 123. In general, the particle size of the aluminum metal is in the range of 1–100 microns.

The diluents used for the reduction are aromatic hydrocarbons having melting points below about 10° C. or mixtures of such diluents with inert aliphatic diluents like n-octane, n-decane, etc. Examples of suitable diluents are benzene, toluene, xylene, mesitylene, pseudocumene, ethylbenzene, cymene, tetraline, decalin, chlorobenzene, o-dichlorobenzene, orthochlorotoluene and the like. Benzene used at a pressure high enough to allow the reduction to take place above about 110° C. is particularly preferred since this diluent does not form resinous materials or other decomposition products during the reduction reaction.

The co-crystallized product is present in the aromatic diluent in finely divided crystalline form. It can then be activated directly with an aluminum alkyl compound. Alternatively it can be separated from the reaction mixture, such as by filtering, preferably at or close to the temperature of the reduction, then pebble-milled or preferably ball-milled when dry to produce a highly active catalyst component, and thereafter slurried in a hydrocarbon diluent and treated with an aluminum alkyl compound.

The beforementioned method of preparation is important since either the addition of aluminum to the titanium-vanadium salts in the aromatic diluent or operating below the temperature stated results in preferential reduction of the vanadium compound and the failure to obtain a true co-crystallized three-component system. This failure is apparent in the lesser activity of the catalyst system.

Alternatively, the co-crystallized components of this invention can be obtained by reacting the necessary materials, e.g. aluminum+titanium and vanadium halides in a bomb at about 200°–400° C., preferably 220°–300° C., and using reaction times in the order of 0.5 to 10 hours, preferably 1–6 hours.

This invention and its advantages will be better understood by reference to the following examples.

EXAMPLE 1

Two samples of catalyst components were prepared. In the first, a mixture of $TiCl_4$ and $VCl_4$ containing one mole of transition metal halide was added to a 2 l. round bottomed flask containing 350 ml. toluene and equipped with stirrer, cooler, thermometer and addition funnel. ⅓ gram atom (9 g.) of Al powder (Alcoa #101, ball milled under nitrogen) slurried in 200 ml. toluene was then added slowly at room temperature and under efficient stirring. Some heat was immediately evolved by the reaction of Al with $VCl_4$ particularly in the case where the transition metal halide mixture contained 10 mole percent $VCl_4$. The temperature was then increased to refluxing, about 112° C., causing complete reduction of the transition metal halides to their trivalent form. The reduced material was recovered by filtration after refluxing for 3–4 hours. It was thoroughly washed with n-heptane, dried in vacuo below 100° C. and milled with steel balls for 3 days. These systems are designated as Al→Ti—V in Table I.

In the second series of reduction experiments the transition metal mixture (1 mole in 200 ml. toluene) was added to the aluminum slurried in 300 ml. of refluxing toluene. Under these conditions both the $TiCl_4$ and $VCl_4$ were reduced almost instantaneously yielding a co-crystallized product. These components are designated as Ti—V→Al in Table I.

The components prepared in the manner stated plus one component made by aluminum reduction of $TiCl_4$ were activated with 2 moles of aluminum triethyl and utilized in the polymerization of propylene at atmospheric pressure using a reaction time of 2 hours at about 75° C. and in xylene diluent. Further details and results are given in Table I below.

*Table I*

| Cat. Prep. | Mole percent V | Cat. Eff., g./g.[a] | [η][b] | Mn×10⁻³[c] | Tensile | d |
|---|---|---|---|---|---|---|
| Ti→Al | 0 | 265 | 3.39 | 260 | 4,240 | 0.8975 |
| Ti—V→Al | 5 | 316 | 3.50 | 270 | 3,965 | 0.8964 |
| Ti—V→Al | 10 | 401 | 2.57 | 155 | 4,210 | 0.8986 |
| Ti—V→Al | 10 | 405 | 2.76 | 165 | 3,865 | 0.8969 |
| Al→Ti—V | 5 | 322 | 2.92 | 195 | 4,030 | 0.8980 |
| Al→Ti-V | 10 | 219 | 2.66 | 162 | 4,200 | 0.8969 |
| Al→Ti-V | 10 | 223 | 2.81 | 185 | 3,675 | 0.8967 |

[a] Calculated on the solid catalyst component.
[b] Intrinsic viscosity.
[c] Number ave. mol. wt. according to Harris correlation, J. Polymer Science, 8, 361 (1952).

The improved catalyst efficiencies of the co-crystallized component of this invention over the control (Ti→Al) and over the systems where true co-crystallization did not occur (Al→Ti—V) is apparent.

EXAMPLE 2

An example similar to that of Example 1 was run except that a tricrystalline catalyst component was also prepared in a bomb referred to below as the dry method.

The systems were employed for polymerizing propylene in exactly the same manner as in Example 1. The results are presented below in Table II.

*Table II*

| Experiment | Catalyst Preparation | Polym. Temp. ° C. | V Mole percent | Catalyst Eff., g./g.[a] |
|---|---|---|---|---|
| A | Ti—V→Al | 75 | 0 | 115 |
| B | Ti—V→Al | 75 | 5 | 137 |
| C | Ti—V→Al | 75 | 10 | 174 |
| D | Ti—V→Al | 75 | 10 | 176 |
| E | Al→Ti—V | 75 | 10 | 95 |
| F | Al→Ti—V | 75 | 10 | 97 |
| G | Dry Method | 75 | 33 | [b] 234 |
| H | do | 75 | 50 | 194 |
| I | do | 60 | 33 | 174 |
| J | do | 60 | 50 | 160 |
| K | do | 60 | 100 | 40 |

[a] G. polymer per g. of total catalyst.
[b] A corresponding $TiCl_3 \cdot 0.33\ AlCl_3$ catalyst gives 190 g./g. under similar conditions.

This table shows how the catalyst efficiency increases with the incorporation of vanadium into the crystalline system but passes through a maximum and diminishes again with the exclusion of titanium. It also shows the increased catalyst efficiency with the true co-crystallized system as contrasted to those where such co-crystallization does not occur.

EXAMPLE 3

Further details are presented below on the bomb preparation of the catalyst components of the invention for completeness. These are presented in Table III.

Table III

PREPARATION OF CRYSTALLINE $y$ TiCl$_3$(1—y) VCl$_3$.0.33 AlCl$_3$ CATALYST

[300 ml. rocking bomb]

| Composition | (A) | (B) |
|---|---|---|
| Starting Materials: | | |
| TiCl$_4$, mole | 1/2 | 2/3 |
| VCl$_4$, mole | 1/2 | 2/3 |
| Al, atom | 1/3 | 1/3 |
| Total Charge, g | 200.5 | 200 |
| Reaction Conditions: | | |
| Maximum Temp. ° C | 240 | 230 |
| Time, hours | a 15 | a 15 |
| Yield, g. b | 163 | 168 |
| Color of Product | (c) | (c) |

(A) 0.5 TiCl$_3$.0.5 VCl$_3$.0.33 AlCl$_3$.
(B) 0.67 TiCl$_3$.0.33 VCl$_3$.0.33 AlCl$_3$.
a The actual reaction time was much shorter as shown by the time-temperature relationship early in the reaction.
b After washing with dry n-heptane, drying in vacuo and ball milling.
c Brownish Purple.

EXAMPLE 4

The effect of incorporating vanadium into the cocrystallized catalyst system on the Bell brittleness temperature of polypropylene is shown in this example. The catalyst components were prepared by either the slurry or bomb (dry technique). Further details are indicated in Table IV below.

These results demonstrate the marked decrease in Bell Brittleness temperature obtained by the incorporation of vanadium into the co-crystallized catalyst system. The diminution in catalyst efficiency and tensile strength as the vanadium exceeds the maximum permitted is also apparent.

The advantages of this invention will be apparent to those skilled in the art. Novel catalyst components of increased activity are made available and the properties of the polymers produced thereby are improved.

It is also possible to replace the aluminum reducing material with other metals such as Ti, Ga, In, provided the reaction conditions are properly modified to allow co-crystallization of the titanium and vanadium halides to take place.

It is to be understood that this invention is not limited to the specific examples which have been offered merely as illustrations and that modifications may be made without departing from the spirit of the invention.

What is claimed is:

1. An improved catalyst system comprising a cocrystallized titanium, vanadium and aluminum component corresponding substantially to the formula $$y \text{ TiX}_3 \cdot (1-y) \text{ VX}_3 \cdot 0.33 \text{ AlX}_3$$

wherein X is halogen and $y$ is .50 to .97, admixed with an aluminum alkyl compound corresponding to the formula wherein R and R' are alkyl groups having from 2 to 8 carbon atoms and X' is selected from the group consisting of hydrogen, chlorine, and alkyl radicals having from 2 to 8 carbon atoms.

2. The improved system of claim 1 in which $y$ is .67 to .90.

3. The system of claim 2 in which the aluminum alkyl compound is aluminum triethyl.

4. The system of claim 2 wherein X is chlorine.

5. The system of claim 2 wherein X is bromine.

Table VI $y$ TiCl$_3$.(1—y) VCl$_3$.3K AlCl$_3$ CATALYSTS FOR PROPYLENE POLYMERIZATION
[2.1 glass atm. batch unit; xylene; 2 AlEt$_3$/(Ti+V)Cl$_3$/75° C.]

| Mole Percent Vanadium | Catalyst Preparation | Days Ball Milled | Catalyst Efficiency, g./g./2 hrs. | Molecular Weight×10$^{-3}$ | Tensile, p.s.i. | Bell Brittleness, ° F. |
|---|---|---|---|---|---|---|
| 0 | Dry | 4 | 190 | 165 | 4,540 | 65–80 |
| 0 | Slurry (toluene) | 3 | 115 | 260 | 4,400 | 65–80 |
| 10 | Slurry (toluene) | 3 | 175 | 160 | 4,200 | 55–60 |
| 33 | Dry | 6 | 234 | 185 | 3,000 | 45 |
| 50 | Dry | 6 | 194 | 160 | 2,520 | 30 |
| 100 | Dry | 5 | 40 | 240 | 2,010 | 25–30 |

References Cited by the Examiner

UNITED STATES PATENTS

| | | | |
|---|---|---|---|
| 2,790,704 | 4/1957 | Lewis | 23—87 |
| 2,905,645 | 9/1959 | Anderson et al. | 252—429 |
| 2,962,451 | 11/1960 | Schreyer | 252—429 |
| 3,001,951 | 9/1961 | Tornqvist et al. | 252—429 |
| 3,032,513 | 5/1962 | Tornqvist et al. | 252—429 |
| 3,061,410 | 10/1962 | Toland | 23—87 |
| 3,078,144 | 2/1963 | Bown et al. | 252—429 |

FOREIGN PATENTS

| | | |
|---|---|---|
| 563,350 | 6/1958 | Belgium. |
| 799,850 | 8/1958 | Great Britain. |
| 884,249 | 12/1961 | Great Britain. |

TOBIAS E. LEVOW, *Primary Examiner.*

SAMUEL H. BLECH, *Examiner.*